(12) United States Patent
Jiang et al.

(10) Patent No.: US 7,941,837 B1
(45) Date of Patent: May 10, 2011

(54) LAYER TWO FIREWALL WITH ACTIVE-ACTIVE HIGH AVAILABILITY SUPPORT

(75) Inventors: Dongyi Jiang, Milpitas, CA (US);
Chih-Wei Chao, Saratoga, CA (US);
Rakesh Nair, Sunnyvale, CA (US);
Daniel Hirschberg, Foster City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1022 days.

(21) Appl. No.: 11/751,731

(22) Filed: May 22, 2007

Related U.S. Application Data

(60) Provisional application No. 60/912,555, filed on Apr. 18, 2007.

(51) Int. Cl.
*G06F 9/00* (2006.01)
(52) U.S. Cl. ............ 726/11; 713/153; 370/352; 370/394
(58) Field of Classification Search ...................... 726/11
See application file for complete search history.

(56) References Cited

U.S. PATENT DOCUMENTS

| | | | |
|---|---|---|---|
| 5,968,176 A * | 10/1999 | Nessett et al. | 726/11 |
| 6,182,226 B1 * | 1/2001 | Reid et al. | 726/15 |
| 6,304,973 B1 * | 10/2001 | Williams | 726/3 |
| 7,103,055 B2 * | 9/2006 | Kadambi et al. | 370/409 |
| 7,409,707 B2 * | 8/2008 | Swander et al. | 726/13 |

* cited by examiner

*Primary Examiner* — Kambiz Zand
*Assistant Examiner* — Amare Tabor
(74) *Attorney, Agent, or Firm* — Shumaker & Sieffert, P.A.

(57) ABSTRACT

Techniques are described to enable two or more layer two (L2) firewall devices to be configured as a high availability (HA) cluster in an active-active configuration. A first layer two (L2) firewall and a second L2 firewall are positioned within the same L2 network. The first L2 firewall and the second L2 firewall are concurrently configured with active virtual security devices (VSDs) within the L2 network, and concurrently apply L2 firewall services to packets within the L2 network. A VSD of one of the L2 firewalls automatically switches to an active VSD status for a VSD group in place of a VSD of another L2 firewall when the other L2 firewall fails.

23 Claims, 7 Drawing Sheets

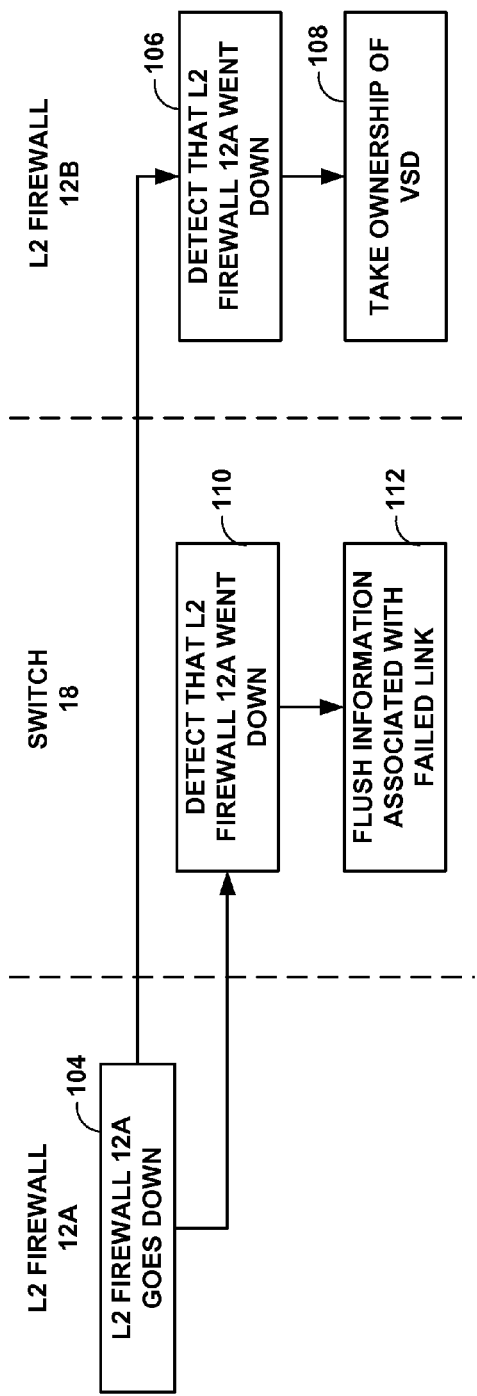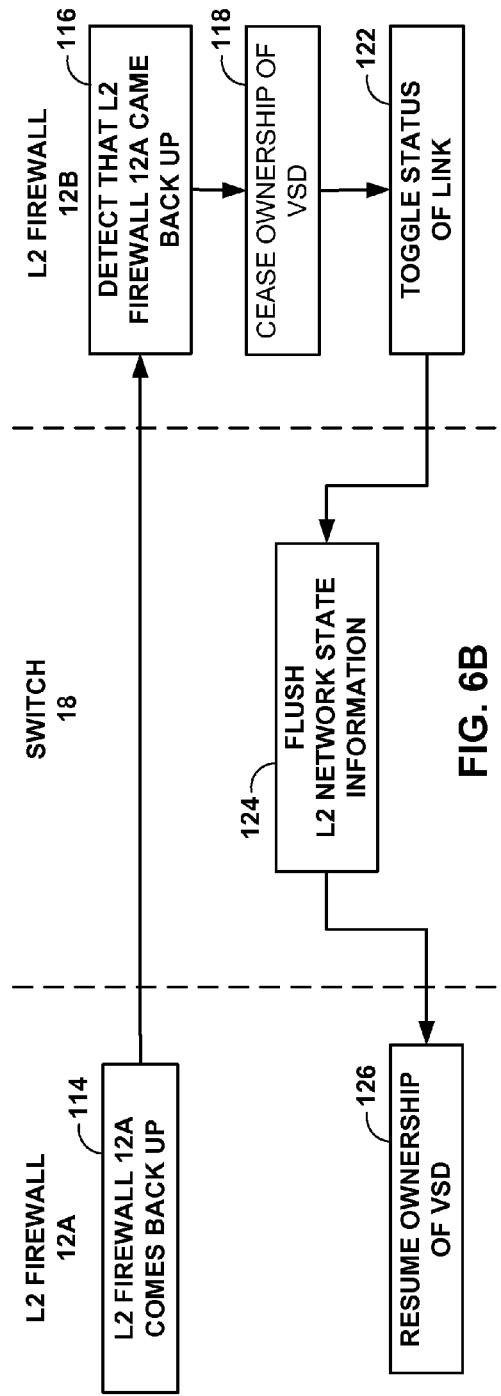

LAYER TWO FIREWALL WITH ACTIVE-ACTIVE HIGH AVAILABILITY SUPPORT

This application claims the benefit of U.S. Provisional Application Ser. No. 60/912,555, filed Apr. 18, 2007, the entire content of which is incorporated herein by reference.

TECHNICAL FIELD

The invention relates to computer networks and, more particularly, to availability of services within computer networks.

BACKGROUND

Due to increasing reliance on network-accessible computers, network security has become a major issue for organizations and individuals. To help ensure the security of their computers, organizations and individuals frequently install security devices between public networks and their private networks. A goal of such security devices is to prevent unwanted or malicious information from the public network from affecting devices in the private network.

One example of a commonly deployed security device is a firewall. A firewall, for example, is a dedicated or virtual device that is configured to permit or deny traffic flows based on an organization's security policies. Firewalls can be implemented at various layers of the network stack, as specified with respect to the Open Systems Interconnection Basic Reference Model ("OSI Reference Model"). For example, a network layer firewall operates at the network layer (i.e., layer three (L3) of the OSI Reference Model) and is referred to an L3 device or network layer device. As another example, a layer two (L2) firewall operates within the second layer of the OSI Reference Model, also known as the data link layer, to restrict L2 network communications in accordance with an organization's policies. An L3 firewall may provide security features as well as packet forwarding, routing or other L3 functionality. A L2 firewall may provide security features along with switching or other L2 functionality. A third type of firewall, referred to as an application-layer firewall, operates above L3 of the network stack to assemble application-layer data and perform deep packet inspection to identify viruses or network attacks.

Unfortunately, network security devices, like other devices, may fail. For example, a software or hardware problem or a power fault within a security device may cause all or a portion of the security device to stop functioning. When a security device fails, all network traffic flowing between the public network and the private network may cease. For an enterprise that depends on such network traffic this may be unacceptable, even if this failure occurs only for a short time. To minimize the chance of a failure causing all network traffic to cease, a backup security device may be installed. Thus, if the security device that has primary responsibility for performing the security services (i.e., the master security device) fails, the backup security device may be quickly substituted for the master security device. In other words, the failing security device "fails over" to the backup security device. After failing over to the backup security device, the backup security device becomes the master security device.

SUMMARY

In general, the invention is directed to techniques for improving availability of layer two (L2) security devices, e.g., L2 firewalls. For example, the techniques may enable two or more L2 firewall devices to be configured as a high availability (HA) cluster in an active-active configuration. That is, the techniques allow the L2 firewall devices to simultaneously be "active" in that the devices simultaneously process packets in different virtual local area network (VLAN) broadcast domains. Moreover, each active L2 firewall device operates as a backup for the other L2 firewall device in the cluster. This may allow the HA L2 firewall cluster to increase the overall processing throughput while providing HA network redundancy.

As described herein, the techniques allow two or more L2 firewall devices to simultaneously be active within a network and without separation by an L3 device. For example, an HA cluster of L2 security devices can be defined to include an active L2 security device and a backup L2 security device forming an HA pair of virtual security devices. HA clustering may be employed to improve the availability of security services provided by the L2 devices. Corresponding VLAN identifiers are associated with each of the security devices so that the different security devices actively service different VLANs, i.e., simultaneously process packets in different virtual local area network (VLAN) broadcast domains. An active-active configuration of an HA pair may be implemented by superimposing two active-passive pairs on the same two network devices for two different sets of VLAN identifiers.

In one embodiment, a method comprises concurrently designating a first L2 firewall and a second L2 firewall as active L2 firewalls within the same L2 network, and concurrently applying L2 firewall services to packets within the L2 network with the first L2 firewall and the second L2 firewall.

In another embodiment, a method comprises assigning a layer two (L2) firewall to a plurality of different virtual security device (VSD) groups for a single L2 network, wherein each of the VSD groups has at least one other assigned VSD on another L2 firewall, designating a VSD within the L2 firewall as an active VSD for at least one of the VSD groups, associating one or more VLAN identifiers with the VSD groups, and selectively applying firewall services to packets with the L2 firewall based on VLAN identifiers within the packets.

In another embodiment, an L2 firewall comprises a network interface that receives a packet having a VLAN identifier, a computer-readable storage medium for storing configuration information, wherein the configuration information configures the L2 firewall with a plurality of virtual security devices (VSDs) that provide L2 firewall services within a single L2 network, and associated each of the VSDs with a VSD group, and a control unit to apply the L2 firewall services.

In a further embodiment, a system comprises a first L2 firewall with an L2 network, and a second L2 firewall positioned within the same L2 network as the first L2 firewall, wherein the first L2 firewall and the second L2 firewall are concurrently configured with active virtual security devices (VSDs) within the same L2 network and concurrently apply L2 firewall services to packets within the L2 network.

In another embodiment, a computer-readable medium comprises instructions for causing a programmable processor to receive configuration information at a layer two (L2) firewall having L2 connectivity to configure the L2 firewall to include a plurality of virtual security devices (VSD), wherein each of the VSDs belongs to one of a plurality of VSD groups having other VSDs configured on at least one other L2 firewall, receive configuration information at the L2 firewall that specifies a priority level of the VSDs of the L2 firewall for each of the VSD groups, wherein the priority level dictates whether the VSDs L2 firewall are active VSDs for the respective VSD group, receive configuration information at the L2 firewall that associates one or more VLAN identifiers with the VSDs, receive a packet having a VLAN identifier, and determine, with the L2 firewall, whether the VLAN identifier of the packet corresponds to an active VSD for the L2 firewall.

Embodiments of the invention may provide one or more advantages. For example, the techniques may avoid several problems encountered when attempting to implement L2 firewalls as an active-active HA pair. In general, active-active L2 firewalls are problematic in that two L2 devices active simultaneously may tend to create broadcast storm or duplicate L2 communications. That is, two simultaneously active L2 devices in a network tends to introduce data loops, i.e., the broadcast of an L2 communication by one device which in turn causes the second L2 device to broadcast the same L2 communication back to the first device. The presence of a data loop may have severe adverse affects on a network. For example, a data loop may result in consumption of significant bandwidth and resources. Thus, it is often necessary to eliminate data loops from the L2 network topology.

One typical approach in addressing data loops is to deploy the Spanning Tree Protocol (STP) within the L2 network to share information between the L2 devices and eliminate data loops by reducing the L2 network to a single spanning tree having a single path between end nodes. Moreover, the STP would tend to select one of the two L2 firewalls to which to pass all of the L2 traffic, which would effectively reduce the HA pair to active-backup configuration. In order to select different L2 firewalls to which to pass traffic for different VLAN broadcast domains, an administrator would need to configure per-VLAN STP parameters on all surrounding switches, which may be difficult or not possible on some switches. The techniques described herein do not require use of per-VLAN STP to avoid broadcast storms, thereby eliminating the requirement that the L2 firewalls run per-VLAN STP.

Moreover, the active-active HA L2 firewall cluster techniques described herein may provide advantages over an active-backup HA configuration, which utilizes only one of the L2 firewalls to process traffic at a given time. The active-backup HA L2 firewall cluster, for example, typically requires more hardware and provides less throughput than active-active HA configuration.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 5, 6A-6B are flowcharts illustrating example operation of network devices within the network system of FIGS. 2A-2B in accordance with the principles of the invention.

DETAILED DESCRIPTION

Figure 1:
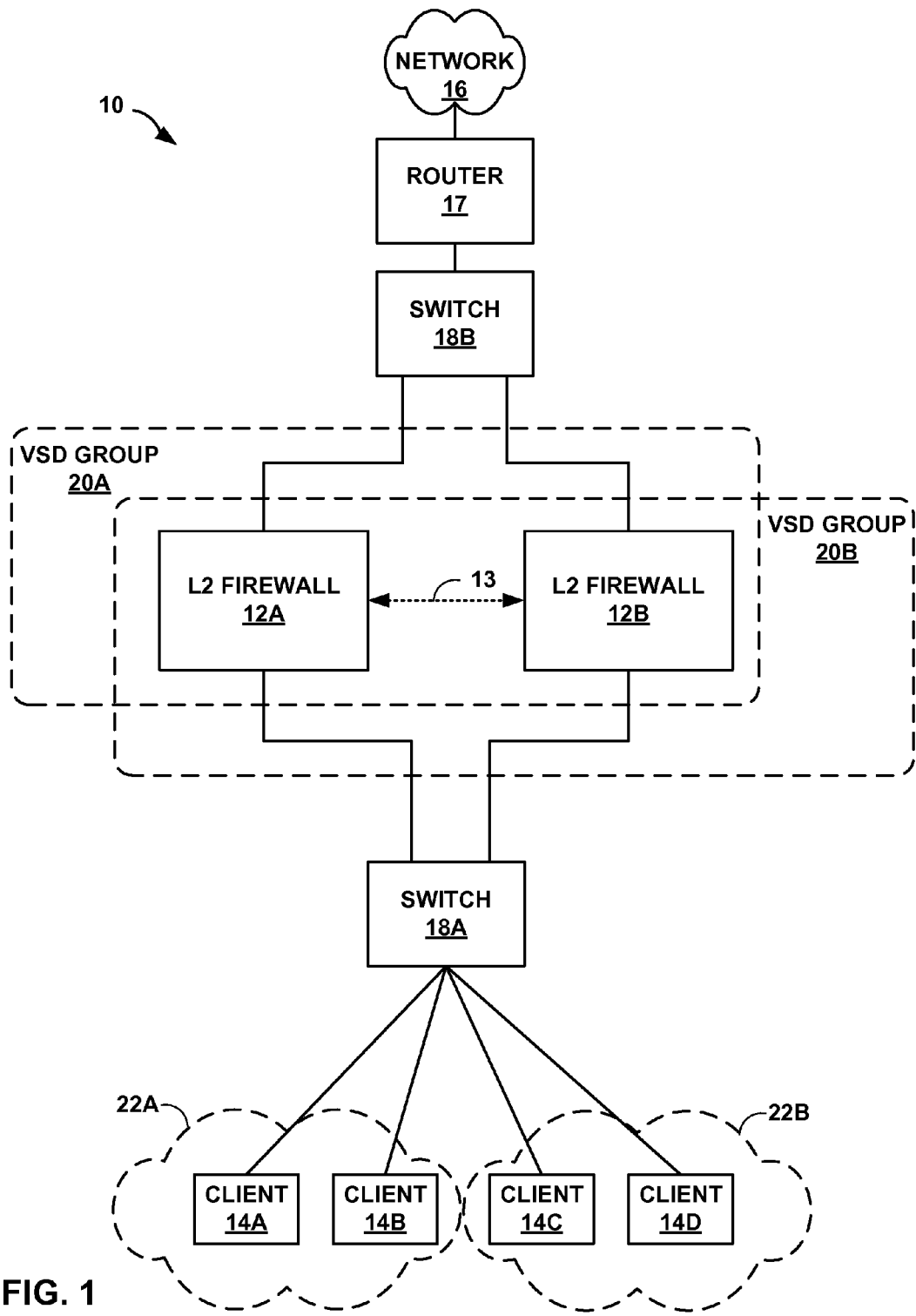
FIG. 1 is a block diagram illustrating an example system in which layer two (L2) firewalls operate in an active-active configuration.

FIG. 1 is a block diagram illustrating an example network system 10 in which layer two (L2) firewalls 12A-12B ("L2 firewalls 12") operate in an active-active high availability (HA) configuration. System 10 includes client devices 14A-14D ("client devices 14") that interact with network 16 via router 17, switches 18A-18B ("switches 18") and L2 firewalls 12. For example, client devices 14 may send and receive packets to and from network 16. L2 firewalls 12 may provide security functionality to protect client devices 14 from network attacks. In addition, L2 firewalls 12 may restrict certain communications by client devices 14 from passing through L2 firewalls 12. That is, L2 firewalls 12 operate within the second layer of the OSI Reference Model, i.e., the data link layer, to restrict L2 network communications in accordance with an organization's policies or configuration settings generally.

As an HA pair, L2 firewalls 12 each use private connection 13, an out-of-band connection, to exchange messages to verify the operational status of the other. That is, private connection 13 may be a dedicated cable or link coupled to dedicated ports of L2 firewalls 12 by which the L2 firewalls exchange so-called "heartbeat" or "keepalive" messages to periodically indicate their operational status.

As described herein, L2 firewall 12 can be configured as an HA cluster in an active-active configuration. That is, the techniques allow L2 firewalls 12 to simultaneously be "active" in that the firewalls simultaneously process different L2 communications for network system 10. As described herein, L2 firewalls 12 may be configured to process L2 communications for different virtual local area network (VLAN) broadcast domains. Moreover, each active L2 firewall device 12 operates as a backup for the other L2 firewall device in the HA cluster. This may allow the HA L2 firewall cluster to increase the overall processing throughput while providing HA network redundancy.

For example, an administrator may partition client devices 14 into two or more subgroups, and assign each subgroup to a different virtual local area network (VLAN). In the example of FIG. 1, the administrator has assigned client devices 14A and 14B to VLAN 22A, and has assigned client devices 14C and 14D to VLAN 22B.

The administrator may also define one or more virtual security devices (VSDs) within system 10. For example, for VLANs 22A and 22B, the administrator may configure redundant VSDs on L2 firewalls 12A and 12B according to TABLE 1:

TABLE 1

| Device | VSD | VSD Group | VLAN(s) | Priority |
|---|---|---|---|---|
| L2 firewall 12A | VSD1 | VSD Group 20A | {VLAN 22A} | High |
| L2 firewall 12A | VSD2 | VSD Group 20B | {VLAN 22B} | Low |
| L2 firewall 12B | VSD1 | VSD Group 20A | {VLAN 22A} | Low |
| L2 firewall 12B | VSD2 | VSD Group 20B | {VLAN 22B} | High |

The administrator associates each of VLANs 22A-22B ("VLANs 22") with one of VSD groups 20A, 20B. For example, VLAN 22A may be associated with VSD group 20A and VLAN 22B may be associated with VSD group 20B. VLAN identifiers for VLANs 22 are then assigned to each of the VSDs so that the different physical L2 firewalls 12 initially actively service different VLANs. That is, L2 firewalls 12 simultaneously process L2 communications in different virtual local area network (VLAN) broadcast domains. In this manner, an active-active configuration of L2 firewalls 12 may be implemented by superimposing two active-passive pairs of VSDs on the same two firewalls for different sets of VLAN identifiers.

The administrator sets priority values associated for each of the VSDs. The administrator may group VSD1 on L2 firewall 12A and VSD1 on L2 firewall B into VSD group 22A. There can be only one VSD in an active mode (status) at a time in a VSD group, while the remaining VSDs in the VSD group run in a standby mode. As shown in the example of FIG. 1, L2 firewall 12A and L2 firewall 12B have VSDs that are members of VSD 20A and VSD 20B ("VSDs 20").

For example, VSD1 on L2 firewall 12A may be set with the highest priority value for VSD group 20A, and therefore functions as the active firewall device for VSD group 20A (VLAN 22A). VSD1 on L2 firewall 12B is set as a lower priority with respect to VSD1 on L2 firewall 12A and, therefore, operates as the standby backup firewall device for VSD group 20A. Conversely, VSD2 on L2 firewall 12B may be set with the highest priority value for VSD group 20B, and therefore functions as the active device for VSD group 20B, while VSD2 on L2 firewall 12A operates as the standby device for VSD group 20B.

L2 firewall 12A, as the active L2 device for VSD group 20A, processes all L2 data packet (e.g., Ethernet frames) belonging to VLAN broadcast domains associated with VSD group 20A, i.e., VLAN 22A, and disregards (e.g., drops) all L2 data packets belonging to broadcast domains associated with VSD group 20B, i.e., VLAN 22B. Similarly, L2 firewall 12B processes all L2 data packets belonging to VLAN broadcast domains associated with VSD group 20B, i.e., VLAN 22B, and drops all packets belonging to VLAN broadcast domains associated with VSD group 20A, i.e., VLAN 22A. L2 firewalls 12 determine whether to process or drop a given L2 data packet based on a VLAN ID contained in a VLAN tag associated with the L2 packet. The VLAN tag, for example, is typically used within an L2 header in front of the L3 header on a packet.

In operation, if L2 firewall 12A detects via private connection 13 that L2 firewall 12B is no longer responding to messages, L2 firewall 12A determines that L2 firewall 12B has failed or is otherwise inactive. In response, VSD2 of L2 firewall 12A takes over as the active VSD for VSD group 20B since VSD2 of L2 firewall 12A is now the highest priority VSD within VSD group 20B. Similarly, if L2 firewall 12B detects that L2 firewall 12A has failed, VSD1 of L2 firewall 12B takes over as the active VSD for VSD group 20A since VSD1 of L2 firewall 12B is now the highest priority VSD for VSD group 20A.

In this manner, two virtual security device groups are defined (VSD groups 20A, 20B), each having a HA active-backup configuration using two different physical devices. An active-active configuration of an HA pair of L2 firewalls 12A, 12B is then implemented by superimposing the two active-passive pairs of VSDs on the same two L2 firewalls, as shown in FIG. 1.

Switches 18A, 18B are L2 switches that couple the active-active HA cluster of L2 firewalls 12 to client devices 14A-14D (and thereby to client devices 14), and to router 17 (and thereby to network 16), respectively. As L2 switches, switches 18A, 18B initially broadcasts all L2 packets to all ports, thereby providing L2 connectivity. As L2 devices, switches 18 typically "learn" of other L2 devices coupled to each port and maintain state information to reflect this learning. For example, over time, switches 18A, 18B receive L2 communications from devices within network 10 and learn particular destination Media Access Control (MAC) addresses downstream from each port.

As one example, switch 18A may learn that packets having a destination MAC address of $DM_1$ of a client device 14 behind L2 firewall 12A need to be forwarded out a particular hardware port. Upon receiving subsequent packets with destination MAC address $DM_1$, switch 18A sends the packets via the port associated with L2 firewall 12A. In this manner, switches 18 typically learn the MAC addresses behind firewalls 18 and other devices within network system 10, and can forward L2 communications out certain ports without necessarily broadcasting the communications.

In some embodiments, client devices produce L2 communications (e.g., L2 data packets) having VLAN identifiers for the particular VLAN to which they are assigned. Alternatively, client devices 14 may not be aware that they are assigned to different VLANs, i.e., client devices 14 may not be VLAN-aware. In this case, L2 data packets (Ethernet frames) received by switch 18A will not have VLAN tags attached to them. In this case, switch 18A can add the VLAN tags within the L2 header of the data packets prior to forwarding to one of L2 firewalls 12, (e.g., based on ports).

In some embodiments, L2 firewalls 12 are located on the same rack, and connected directly via ports. In other embodiments, L2 firewalls 12 may be geographically separated and connected by a long-range fiber cable. Other configurations are possible. The components of system 10 shown in FIG. 1 are merely exemplary, and other components not shown may be included. For example, L2 firewalls 12 may be configured with more than two VSDs, and system 10 may include more than two VSD groups.

Figure 2A:
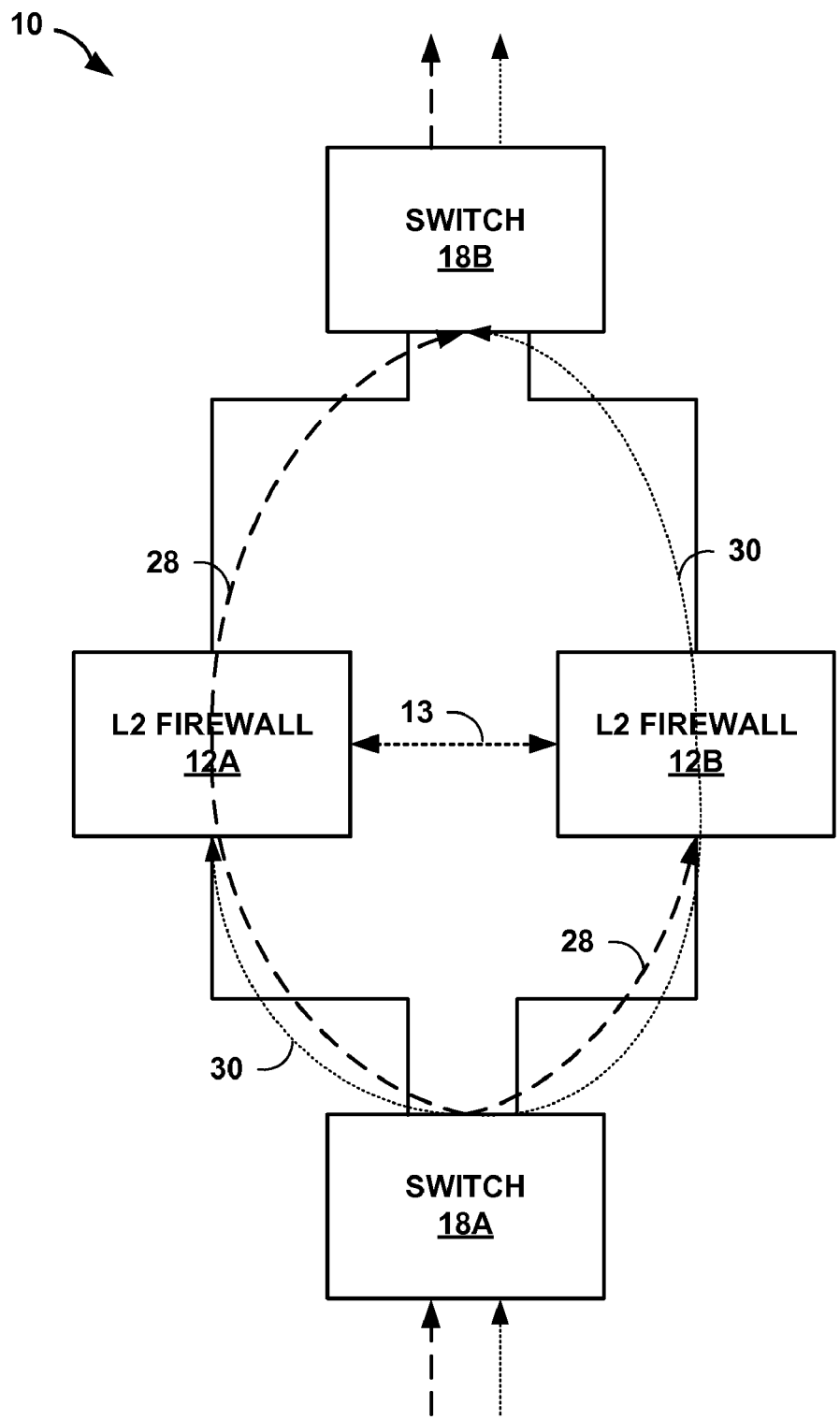
FIGS. 2A-2B are block diagrams illustrating an example network system before and after one of the L2 firewalls of FIG. 1 fails.

FIG. 2A is a block diagram illustrating network system 10 in a state where both L2 firewall 12A and L2 firewall 12B are operational. As described above with respect to FIG. 1, both of L2 firewalls 12 have VSDs that belong to VSD groups 20 and each has an active VSD for one of VSD groups 20 to provide L2 firewall services simultaneously.

As shown in FIG. 2, L2 firewall 12A acts like a closed circuit with respect to permitted L2 data packets 28 corresponding to VLANs associated with VSD group 20A. That is, since VSD1 of L2 firewall 12A is the active VSD for VSD group 20A, L2 firewall 12A processes packets 28 for VSD group 20A. As such, L2 firewall 12A permits those packets that conform to organizational policies or firewall rules, and filters (e.g., drops) any non-conforming packets 28, such as those packets that specify an unauthorized source or destination protocol, port, or network address.

However, L2 firewall 12A acts like an open circuit with respect to packets 30 corresponding to VLANs associated with VSD group 20B. That is, since VSD2 of L2 firewall 12A is designated currently as a standby VSD for VSD group 20B, L2 firewall 12A drops all packets 30. In this manner, L2 firewall 12A prevents data loops associated with packets 30, i.e., prevents packets 30 from looping through network 10 back to L2 firewall 12B and switch 18A.

Similarly, L2 firewall 12B acts like a closed circuit with respect to packets 30 corresponding to VLANs associated with VSD group 20B. That is, since VSD2 L2 firewall 12B is the active VSD for VSD group 20B, L2 firewall 12B processes packets 30 for VSD group 20A to permit only those packets 30 that conform to certain organizational policies or firewalls rules. L2 firewall 12B acts like an open circuit with respect to packets 28 corresponding to VLANs associated with VSD group 20A. That is, since VSD1 of L2 firewall 12B is a standby L2 firewall for VSD group 20A, L2 firewall 12B drops all packets 28. In this manner, L2 firewall 12B prevents data loops associated with packets 28, i.e., prevents packets 28 from looping through network 10 back to L2 firewall 12A and switch 18A.

Although described with reference to packets 28, 30 flowing from switch 18A to L2 firewalls 12, packets flowing from switch 18B to the L2 switches may be processed in a similar manner. For example, router 17 or switch 18B may be configured to insert VLAN tags into communications received from network 16 for processing by L2 firewalls 12 to restrict communications to switch 18A and clients 14 in accordance with organizational policies. Switch 18B may be configured with capability to insert VLAN tags (e.g., based on ports).

L2 firewalls 12 continue to exchange messages through private connection 13 to inform each other of their current operational status, i.e., both active in this example.

Figure 2B:
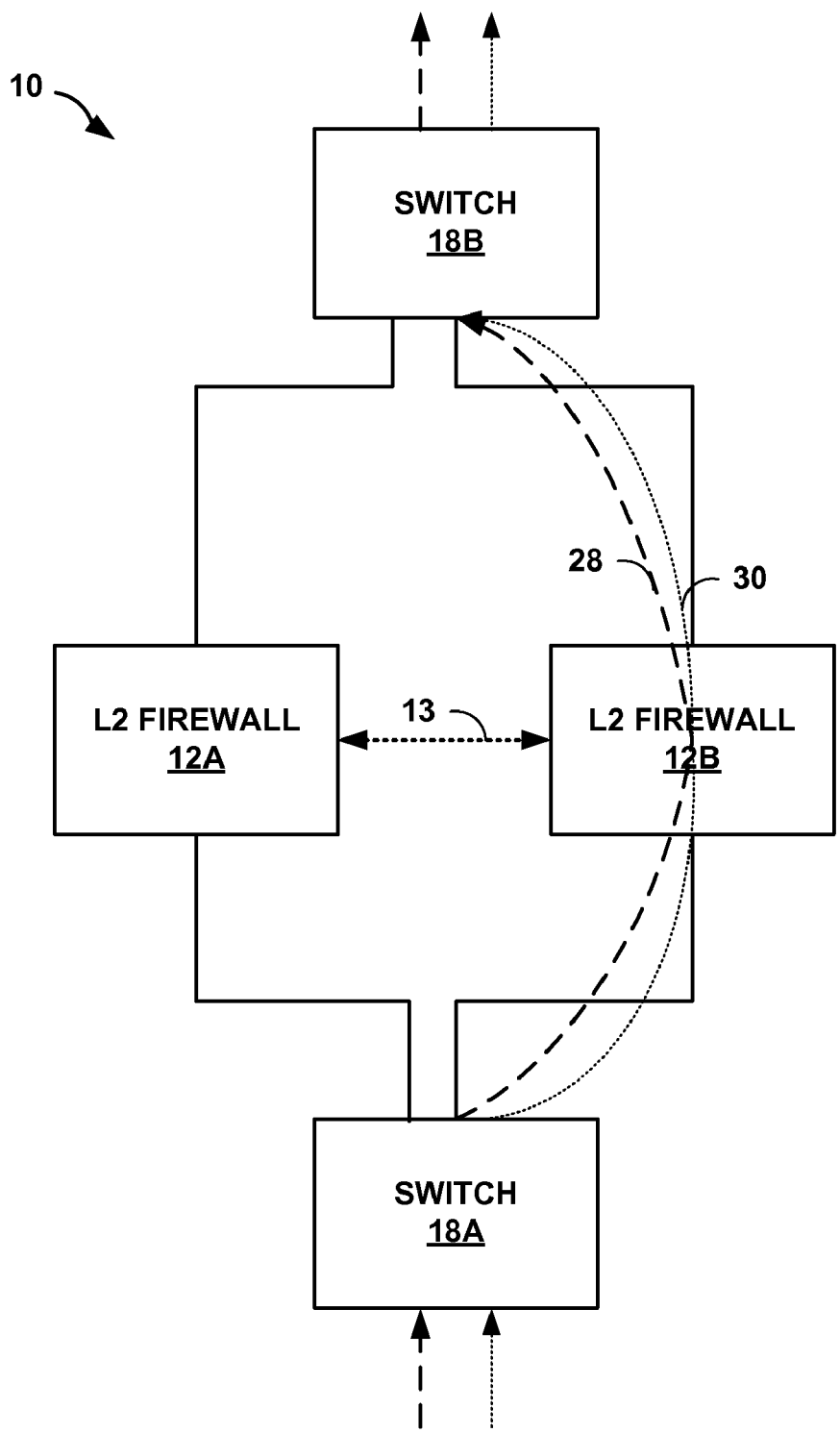

FIG. 2B is a block diagram illustrating network system 10 in a state in which L2 firewall 12A has failed. L2 firewall 12B detects this failure either by receipt of an asynchronous failure message or by failure to receive a periodic heartbeat message from L2 firewall 12A over private connection 13.

In either case, VSD1 of L2 firewall 12B takes over as the active VSD for VSD group 20A and so L2 firewall 12B provides L2 firewall services for client devices 14 in VLAN 22A. Specifically, L2 firewall 12B determines that VSD1 of L2 firewall 12B is now the highest priority VSD for VSD group 20A, and begins processing packets 28 corresponding to VLANs associated with VSD group 20A in addition to the packets 30 corresponding to VLANs associated with VSD group 20B. Thus, L2 firewall 12B processes both packets 28 from VLAN 22A and packets 30 from VLAN 22B after L2 firewall 12A fails.

As described above, switch 18A may eventually learn and maintain state information with respect to MAC addresses associated with each port, thereby developing an L2 topology for network 10. Thus, upon failure of L2 firewall 12A, switch 18A may be in a state in which switch 18A is directing packets to ports based on destination MAC addresses that switch 18A has seen before. When L2 firewall 12A fails, switch 18A may detect a link failure state for the physical link and/or port coupled to L2 firewall 12A. In response, switch 18A may purge all learned MAC information associated with the corresponding port. In turn, switch 18A then broadcasts packets having the purged MAC addresses based on any VLAN broadcast configuration data provided by an administrator. As both L2 firewalls 12 are associated with VSDs within the different VLAN broadcast domains, switch 18A thus begins forwarding the packets to L2 firewall 12B. Switch 18A then proceeds to relearn MAC addresses corresponding to VLANs associated with VSD group 20A and associate the MAC addresses to the port corresponding to L2 firewall 12B.

As with FIG. 2A, FIG. 2B has been described for purposes of example to packets 28, 30 flowing from switch 18A to L2 firewall 12B. Packets flowing from switch 18B to the L2 firewalls 12 may be processed in a similar manner. For example, switch 18B may be configured to insert VLAN tags into communications received from network 16 for processing by L2 firewalls 12 to restrict communications to switch 18A and clients 14 in accordance organizational policies. Upon failure of L2 firewall 12A, switch 18B likewise purges L2 state information and begins broadcasting L2 packets received from network 16. As the firewall having active VSDs for both VSD groups 20, L2 firewall 12B processes packets received from switch 18B for both VLANs.

L2 firewall 12B continues to monitor private connection 13 for a message indicating that L2 firewall 12A has returned to operational status.

Figure 3:
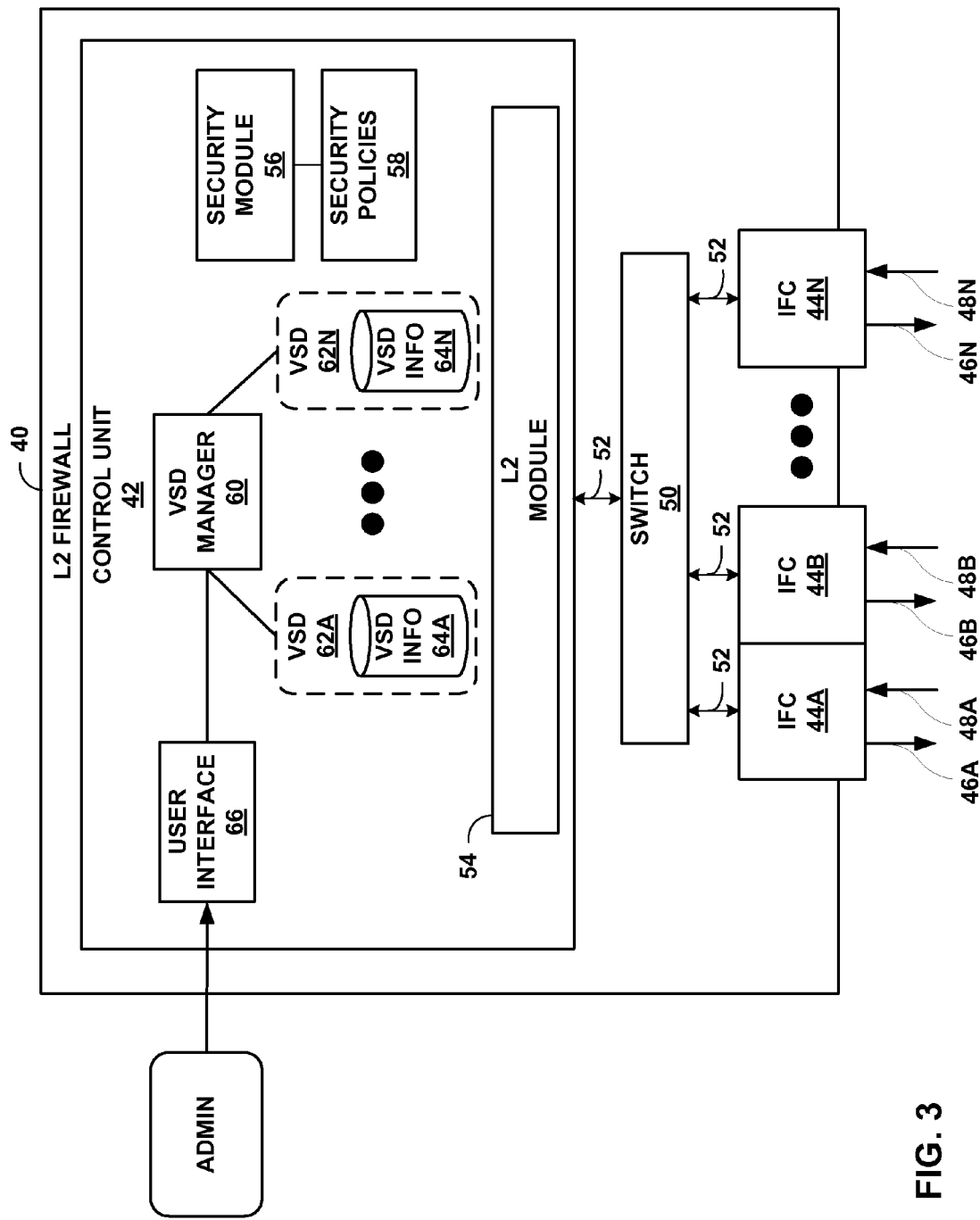
FIG. 3 is a block diagram illustrating an example L2 security device that operates in accordance with the principles of the invention.

FIG. 3 is a block diagram illustrating, in further detail, an example L2 firewall 40 that operates in accordance with the principles of the invention. L2 firewall 40 may operate as part of an active-active HA pair with another L2 firewall. L2 firewall 40 may, for example, represent any of L2 firewalls 12 of FIG. 1.

In the exemplary embodiment illustrated in FIG. 3, L2 firewall 40 includes interface cards (IFCs) 44A-44N (collectively, "IFCs 44") having physical network ports for communicating packets via inbound links 46A-46N ("inbound links 46") and outbound links 48A-48N ("outbound links 48"). IFCs 44 are connected to control unit 42 by a high-speed switch 50 and links 52. In one example, switch 50 comprises separate data busses, switch fabric, switchgear, a configurable crossbar switch or other means for coupling IFCs to control unit 42. Links 52 comprise any form of communication path, such as electrical paths within an integrated circuit, external data busses, optical links, network connections, wireless connections, or other type of communication path. Each IFC 44 may, for example, be represent a separate network interface card (NIC) coupled to control unit 42 in isolation from the other interface cards. IFCs 44 are coupled to inbound links 46 and outbound links 48 via a number of interface ports (not shown).

L2 firewall 40 includes a control unit 42, which may include a microcontroller or embedded microprocessor, that provides an operating environment for L2 module 54, security module 56, and VSD manager 60, which may be implemented as executable software instructions. L2 module 54 provides L2 functionality, such as switching functionality, bridging functionality, or other L2 functionality necessary to forward L2 data packets between IFCs 44.

Security module 56 applies security policies 58 to provide security functions for L2 firewall 40 when forwarding the L2 data packets. For example, security policies 58 may specify filters that security module 56 applies to incoming packets. For example, filters may filter based on a 5-tuple of source IP address, destination IP address, protocol, source port, and destination port. Security module 56 may cause certain packets to be dropped based on security policies 58. The techniques of the invention need not impact the way security module 56 operates compared to a traditional L2 firewall.

A system administrator may provide configuration information to L2 firewall 40 via user interface 66 included within control unit 42. As described, the administrator may configure L2 firewall 40 to include a plurality of VSDs 62A-62N ("VSDs 62"), and to assign the VSDs 62 to different VSD groups. VSD manager 60 manages VSDs 62 and VSD information ("VSD INFO") 64A-64N ("VSD information 64") associated with each of VSDs 62 configured on L2 firewall 40. During this process, the administrator may also configure VSD information 64 to assign one or more VLAN identifiers to each of the VSD groups associated with VSDs 62. The administrator may also assign priority values to VSDs 62 of L2 firewall 40. For example, the administrator may assign VSD 62A a highest priority value for a first VSD group, and a lower priority value for a second VSD group. In one embodiment, VSD information 64 may consist of information such as that shown above with respect to TABLE 1.

When L2 firewall 40 receives a packet having a VLAN identifier, VSD manager 60 may determine whether the VLAN identifier corresponds to a VSD group for which L2 firewall 40 has an active VSD 62. VSD manager 60 may determine whether a VSD 62 is active on L2 firewall 40, i.e., whether the VSD 62 has the highest priority within the VSD group, by accessing VSD information 64 and communicating with other devices associated with each of the VSD groups via private network connections (not shown). For example, L2 firewall 40 and other L2 firewalls may exchange messages that indicate priority levels of the sending device for one or more VSDs. Although VSD information 64 is illustrated in the example of FIG. 3 as consisting of separate data structures for each of VSDs 62, in another embodiment, VSD information 64 may be stored within a single data structure managed by VSD manager 60. The administrator may also configure security policies 58 via user interface 66, which may be a graphical or command line interface presented locally or on a remote terminal.

When L2 firewall 40 receives an L2 data packet via an inbound link 46 of an IFC 44, VSD manager 60 obtains a VLAN identifier from within an L2 header of the packet, and looks up the VLAN identifier within VSD information 64 to determine a VSD 62 with which the packet is associated (e.g., VSD 62A). VSD manager 60 may then check VSD information 64 to determine the priority level of VSD 62A of L2 firewall 40 within the particular VSD group.

When VSD manager 60 determines that VSD 62A of L2 firewall 40 is the highest priority VSD for the VSD group associated with the VLAN identifier of the packet, i.e., VSD 62A of L2 firewall 40 is an active VSD for the VSD group, VSD manager 60 may instruct control unit 42 to continue processing the packet by application of security policies 58 by security module 56 to control forwarding operations by L2 module 54.

VSD manager 60 may determine that VSD 62A of L2 firewall 40 is not currently the highest priority VSD for the VSD group associated with the VLAN identifier of the packet, i.e., VSD 62A of L2 firewall 40 is a backup firewall for the VSD group. As a result, VSD manager 60 may instruct control unit 42 and, in particular, L2 module 54, to drop the L2 data packet or to perform other action upon the packet.

The architecture of L2 firewall 40 illustrated in FIG. 3 is shown for exemplary purposes only. The invention is not limited to this architecture. In other embodiments, L2 firewall 40 may be configured in a variety of ways. In one embodiment, for example, control unit 42 and its corresponding functionality may be distributed within IFCs 44. Moreover, although described with respect to L2 firewall 40, the forwarding techniques described herein may be applied to or incorporate within other types of L2 network devices, such as bridges, switches, hubs, or other L2 network devices.

Control unit 42 may be implemented solely in software, or hardware, or may be implemented as a combination of software, hardware, or firmware. For example, control unit 42 may include one or more processors that execute software instructions. In that case, the various software modules of control unit 42, such as L2 module 54, security module 56, and VSD manager 60, may comprise executable instructions stored on a computer-readable storage medium, such as computer memory or a hard disk.

Figure 4:
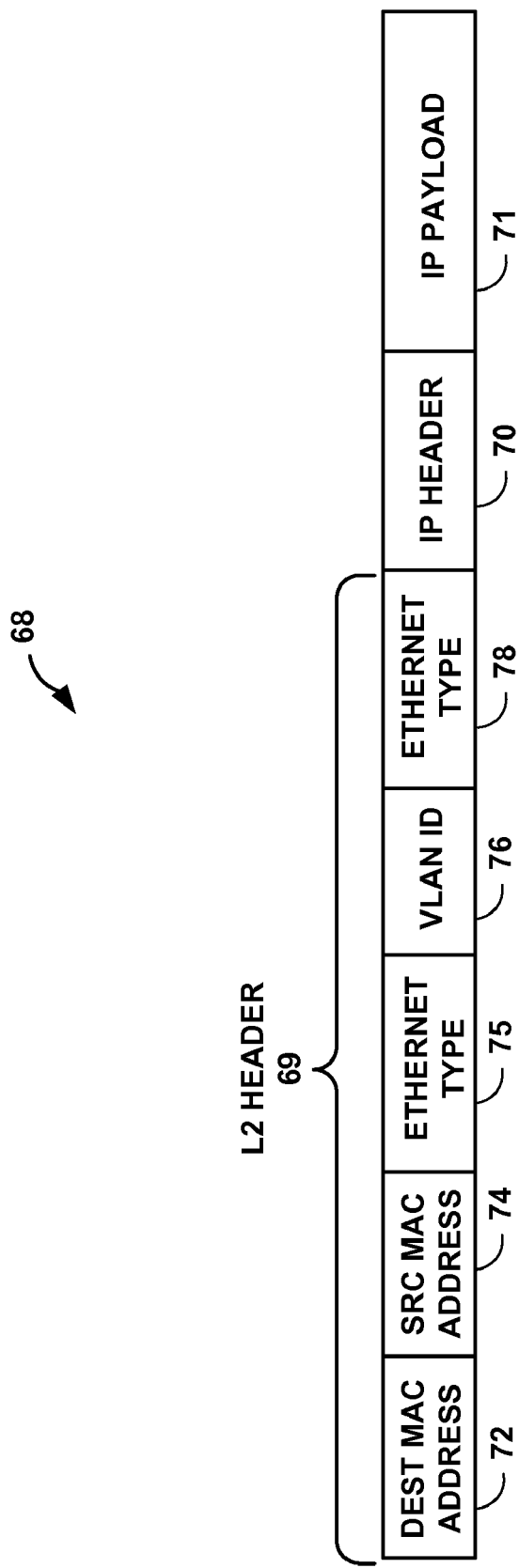
FIG. 4 is a block diagram illustrating an exemplary packet that may be received by an L2 firewall.

FIG. 4 is a block diagram illustrating an exemplary packet 68 that may be received by L2 firewall 40 (FIG. 3) or one of L2 firewalls 12 (FIG. 1) over one or more L2 communications (e.g., Ethernet frames). For example, an L2 firewall 12 may receive a packet 68 from switch 18A. In this example, packet 68 includes an L2 header portion 69, an Internet Protocol (IP) header portion 70, and an IP payload 71. IP header portion 70 may include IP information (not shown). L2 header portion 70 includes a destination MAC (DST MAC) address field 74 that indicates the destination MAC address of the packet, a source MAC (SRC MAC) address field 74 that indicates the source MAC address of the packet, an Ethernet type field 75 that indicates an Ethernet type of 0x8100, which indicates that the following field contains a VLAN identifier (VLAN ID), a VLAN ID field 76 that includes an identifier that specifies a VLAN associated with the packet, and another Ethernet type field 78 that indicates an Ethernet type of 0x800, which indicates that the subsequent payload is an IP packet.

Switch 18A may forward packets based on destination MAC address field 72. For example, if switch 18A has not seen a particular destination MAC address before, switch 18A may broadcast the packet to all devices within the L2 network, i.e., all L2 devices not separated by an L3 device providing data separation. If switch 18A has seen the destination MAC address before, switch 18A may have learned which port on which to forward the packet based on the specific destination MAC address. As described above, L2 firewalls 12A, 12B, and 40 determine whether to handle processing of the packet based on VLAN identifier field 76 and the current operational status of each of the L2 firewalls.

Figure 5:
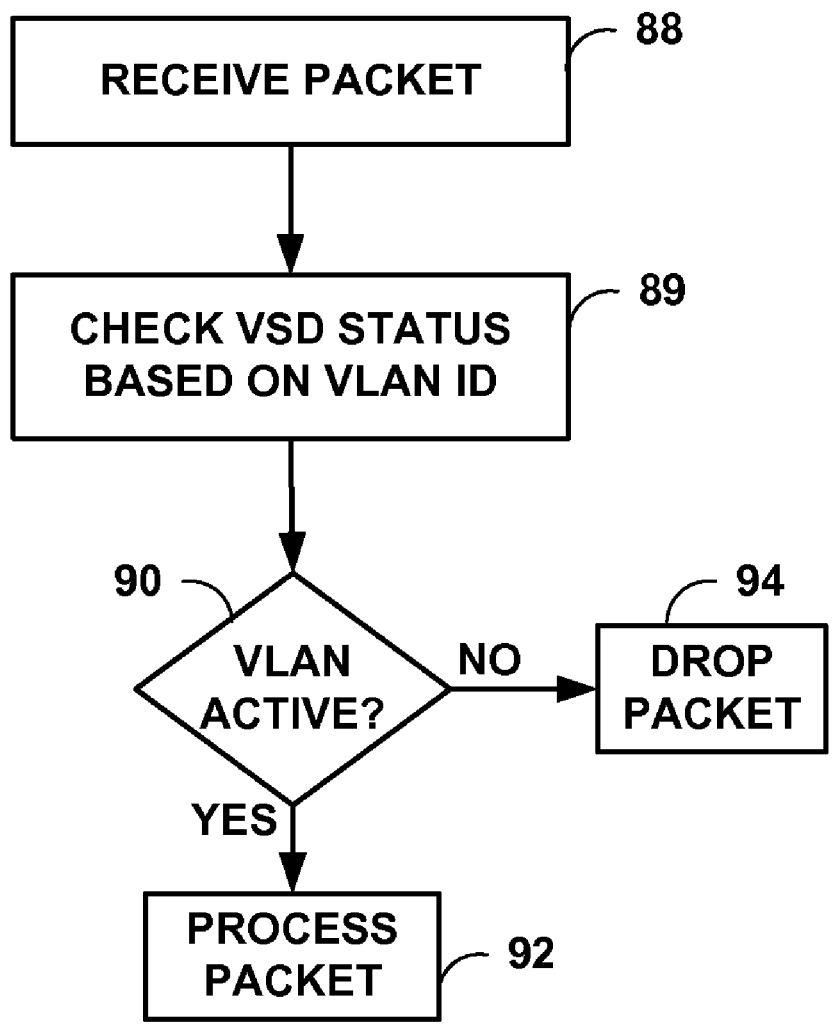

FIG. 5 is a flowchart illustrating exemplary operation of network devices within a network in accordance with the principles of the invention. For purposes of example, FIG. 5 is explained in reference to FIG. 1.

L2 firewall 12A and L2 firewall 12B may receive configuration information from an administrator via respective user interfaces 66 or from an automated software agent. For example, the configuration information may include information that assigns a plurality of VSDs to L2 firewalls 12, information that specifies a priority level of each of the VSDs within a VSD group, and information that associates VLAN identifiers with the VSD groups.

After configuration of L2 firewalls 12, switch 18 may receive a packet (e.g., switch 18A receives a packet from one of client devices 14 or switch 18B receives a packet from network 16). If a destination MAC address contained within the L2 header of the packet is not currently known to switch 18, switch 18 broadcasts the packet to all of its ports. Switch 18 may, for example, broadcast the packet to the ports based on a VLAN tag within the packet relative to VLAN broadcast domains specified for network 10. If the destination MAC address is already known to switch 18, switch 18 forwards the packet via the appropriate port.

As illustrated in FIG. 5, an L2 firewall such as L2 firewall 12A receives a packet from switch 18 (88). L2 firewall 12A determines based on a VLAN identifier contained within the L2 header of the packet whether the VSD on L2 firewall 12A that corresponds to the VLAN identifier is active on L2 firewall 12A (89). If L2 firewall 12A determines that the VLAN identifier corresponds to a VSD on L2 firewall 12A that is active (YES branch of 90), L2 firewall 12A processes the packet according to firewalls rules so as to provide L2 firewall services (92). For example, L2 firewall 12A may apply one or more filters to information contained in headers of the packet to determine whether to forward the packet, drop the packet, log the packet and/or take some other action.

If L2 firewall 12A determines that the VLAN identifier of the packet corresponds to a VSD on L2 firewall 12A that is not active (NO branch of 90), L2 firewall 12A drops the packet (94), thereby preventing any data loops within the active-active HA L2 firewall cluster.

FIGS. 6A-6B are flowcharts illustrating further exemplary operation of network devices within a network in accordance with the principles of the invention. For purposes of example, FIGS. 6A-6B are explained in reference to FIGS. 1 and 3.

FIG. 6A illustrates operation of L2 firewalls 12 and a switch 18 (e.g., either of switches 18A, 18B) when L2 firewall 12A goes down. As described above with reference to the example of FIG. 1, L2 firewalls 12 are configured with VSDs that belong to VSD group 20A and VSD group 20B. In this example, VSD1 of L2 firewall 12A is configured as the active device for VSD group 20A, and VSD2 of L2 firewall 12B is configured as the active device for VSD group 20B, thus forming an active-active HA L2 firewall cluster.

When L2 firewall 12A goes down (104), L2 firewall 12B detects that L2 firewall 12A has failed, either by an asynchronous failure message from L2 firewall 12A or because L2 firewall 12A no longer outputs heartbeat messages on private connection 13 (106). In response, VSD manager 60 of L2 firewall 12B determines that VSD1 of L2 firewall 12B is now the highest priority VSD within VSD group 20A, and so VSD manager 60 takes ownership of VSD group 20A. That is, VSD manager 60 instructs control unit 42 to provide firewall services for packets having the VLAN identifiers for which L2 firewall 12B was previously the backup firewall device, i.e., VLAN identifiers associated with VSD group 20A (108). As a result, VSD1 of L2 firewall 12B is now the active VSD for both VSD group 20A and VSD group 20B.

In addition, switch 18 also detects that L2 firewall 12A has failed either by detecting failure of the physical link or by receipt of an asynchronous message from either of the L2 firewalls 12 (110). For example, switch 18A may sense that a physical link associated with L2 firewall 12A is not longer operational. Upon detection, switch 18 flushes all L2 state information associated with the physical link, thereby causing packets to be broadcasted (112).

At a later time, L2 firewall 12A may come back up, e.g., be rebooted, replaced, serviced, or otherwise come online (114). L2 firewall 12B may detect that L2 firewall 12A came back up (116), such as by receiving a message from L2 firewall 12B via private connection 13. VSD manager 60 of L2 firewall 12B determines that VSD1 of L2 firewall 12B is no longer the highest priority VSD for VSD group 20A, and instructs control unit 42 to stop provided firewall services for packets corresponding to VLANs associated with VSD group 20A (118). After L2 firewall 12B detects that L2 firewall 12A has resumed ownership of VSD group 20A, L2 firewall 12B may toggle the status of its link (122), so that switch 18 may flush all MAC entries associated with that link to again initiate broadcast of packets (124). Switch 18 may detect that L2 firewall 12A came back up, such as by detecting that the physical link associated with L2 firewall 12A has been repaired. L2 firewall 12A determines that VSD1 of L2 firewall 12A is the highest priority VSD for VSD group 20A, and resumes ownership of VSD group 20A by resuming L2 firewall services for packets corresponding to VLANs associated with VSD group 20A (126).

Various embodiments of the invention have been described. Although described in terms of L2 firewall devices, the techniques of the invention may be applied in the context of, or incorporated within, other L2 devices for which it is desired to operate in an active-active mode. These and other embodiments are within the scope of the following claims.

The invention claimed is:

1. A method comprising:
concurrently designating a first layer two (L2) firewall and a second L2 firewall as active L2 firewalls within the same L2 network; and
concurrently applying L2 firewall services to packets within the L2 network with the first L2 firewall and the second L2 firewall by:
receiving, with the first L2 firewall and the second L2 firewall, copies of a same one of the packets within the L2 network; and
disregarding one of the copies of the packet with one of the L2 firewalls based on a virtual local area network (VLAN) identifier associated with the packet,
wherein the first L2 firewall operates with the second L2 firewall within the same L2 network without executing the Spanning Tree Protocol on a per-VLAN basis.

2. A method comprising:
assigning a first layer two (L2) firewall to a plurality of different virtual security device (VSD) groups for a single L2 network, wherein each of the VSD groups has at least one other assigned VSD on another L2 firewall within the single L2 network;
designating a first VSD within the first L2 firewall as an active VSD for at least a first one of the VSD groups;
designating the first VSD within a second L2 firewall of the L2 network as a backup VSD for the first VSD group;
designating a second VSD within the first L2 firewall as a backup VSD for at least a second one of the VSD groups;
designating the second VSD within the second L2 firewall as an active VSD for the second VSD group;
associating one or more virtual local area network (VLAN) identifiers with the VSD groups; and
selectively applying firewall services to packets with the first and second L2 firewall based on VLAN identifiers within the packets.

3. The method of claim 2, wherein selectively applying firewall services comprises:
receiving one of the packets having one of the VLAN identifiers; and
determining, with the first L2 firewall, whether the VLAN identifier of the packet corresponds to an active VSD within the first L2 firewall; and
applying an action to the packet based on a firewall rule when the VLAN identifier of the packet corresponds to an active VSD within the first L2 firewall.

4. The method of claim 3, further comprising:
dropping the packet when the VLAN identifier of the packet does not correspond to an active VSD within the first L2 firewall.

5. The method of claim 2,
wherein designating the VSD within the first L2 firewall as an active VSD comprises receiving configuration information at the first L2 firewall that specifies a priority level of the VSD for the at least one VSD group, and
wherein the priority level controls whether the VSD is the active VSD for the corresponding VSD group.

6. The method of claim 2, further comprising exchanging messages via a private network connection with the other L2 firewalls assigned to the VSD groups to determine whether the VSD of the first L2 firewall has a highest priority level for the one of the plurality of VSD groups.

7. The method of claim 6, further comprising:
determining that one of the other L2 firewalls comprising an active VSD for one of the VSD groups has failed; and
changing an operational status for a VSD of the first L2 firewall to become a new active VSD for the VSD group based on the determination.

8. The method of claim 2, wherein each of the VSD groups includes only a single active VSD at a given time.

9. The method of claim 2, wherein the first L2 firewall operates with other L2 firewalls within the single L2 network without executing the Spanning Tree Protocol on a per-VLAN basis.

10. A layer two (L2) firewall comprising:
a physical network interface that receives a packet having a virtual local area network (VLAN) identifier;

a computer-readable storage medium for storing configuration information, wherein the configuration information configures the L2 firewall with a plurality of virtual security devices (VSDs) that provide L2 firewall services within a single L2 network, and associates each of the VSDs with a VSD group, wherein the configuration information specifies at least one of the VSDs of the L2 firewall as an active VSD within one of a plurality of VSD groups, and wherein the configuration information associates one or more VLAN identifiers with the VSD groups, wherein the L2 firewall is configured to determine that another L2 firewall within the single L2 network has the one of the VSDs specified as a backup VSD; and a control unit to apply the L2 firewall services.

11. The L2 firewall of claim 10, further comprising a virtual security device (VSD) manager that determines whether the VLAN identifier of the received packet corresponds to an active VSD within the L2 firewall.

12. The L2 firewall of claim 11, wherein the control unit applies L2 firewall services to the packet when the VSD manager determines that the VLAN identifier of the packet corresponds to an active VSD within the L2 firewall.

13. The L2 firewall of claim 11, wherein the control unit drops the packet without applying the firewall services to the packet when the VSD manager determines that the VLAN identifier of the packet does not correspond to an active VSD within the L2 firewall.

14. The L2 firewall of claim 11, wherein the L2 firewall exchanges message via a private network connection with other L2 firewalls assigned to the VSD group to determine whether the VSD of the L2 firewall has a highest priority level for the VSD group.

15. The L2 firewall of claim 11, wherein the VSD manager determines that one of the other L2 firewalls comprising an active VSD for the VSD group has failed, and identifies a VSD of the L2 firewall as a new active VSD for the VSD group based on the determination.

16. The L2 firewall of claim 10, wherein the VSD group includes only a single active VSD at a given time.

17. A system comprising:
a first layer two (L2) firewall with an L2 network; and
a second L2 firewall positioned within the same L2 network as the first L2 firewall such that duplicate copies of L2 communications at least are initially communicated to both the first and second L2 firewalls when the first and second L2 firewalls are concurrently configured with active VSDs, wherein the first L2 firewall and the second L2 firewall are concurrently configured with active virtual security devices (VSDs) within the same L2 network and concurrently apply L2 firewall services to packets within the L2 network, and wherein the first L2 firewall operates with second L2 firewall within the same L2 network without executing the Spanning Tree Protocol on a per-VLAN basis.

18. The system of claim 17, further comprising a switch coupling the first L2 firewall to the second L2 firewall, wherein the switch initially forwards copies of the same packets to the first L2 firewall and the second L2 firewall.

19. The system of claim 17, wherein the VSDs of the first and second L2 firewalls are both assigned to a common plurality of VSD groups, and wherein the first and second L2 firewalls are configured with information that associates one or more virtual local area network (VLAN) identifiers with the VSDs.

20. The system of claim 19,
wherein the packets include L2 headers having a VLAN identifier, and
wherein the first L2 firewall and the second L2 firewall respectively determine whether the VLAN identifiers of the packets correspond to an active VSDs of the first L2 firewall and the second L2 firewall.

21. The system of claim 19, wherein a VSD of the second L2 firewall automatically switches to an active VSD status for a VSD group in place of a VSD of the first L2 firewall when the first L2 firewall fails.

22. The system of claim 19, wherein each of the VSD groups includes only a single active VSD at a given time.

23. A non-transitory computer-readable medium comprising instructions for causing a programmable processor to:
receive configuration information at a layer two (L2) firewall having L2 connectivity to configure the L2 firewall to include a plurality of virtual security devices (VSD), wherein each of the VSDs belongs to one of a plurality of VSD groups having other VSDs configured on at least one other L2 firewall;
receive configuration information at the L2 firewall that specifies a priority level of the VSDs of the L2 firewall for each of the VSD groups, wherein the priority level dictates whether the VSDs of the L2 firewall are active VSDs for the respective VSD group;
receive configuration information at the L2 firewall that associates one or more virtual local area network (VLAN) identifiers with the VSDs;
receive a packet having a VLAN identifier; and
determine, with the L2 firewall, whether the VLAN identifier of the packet corresponds to an active VSD for the L2 firewall.

* * * * *